Sept. 29, 1942.  E. G. LEONARDON  2,297,568
SPONTANEOUS POTENTIAL BY INDUCTION
Filed Feb. 25, 1939   2 Sheets-Sheet 1
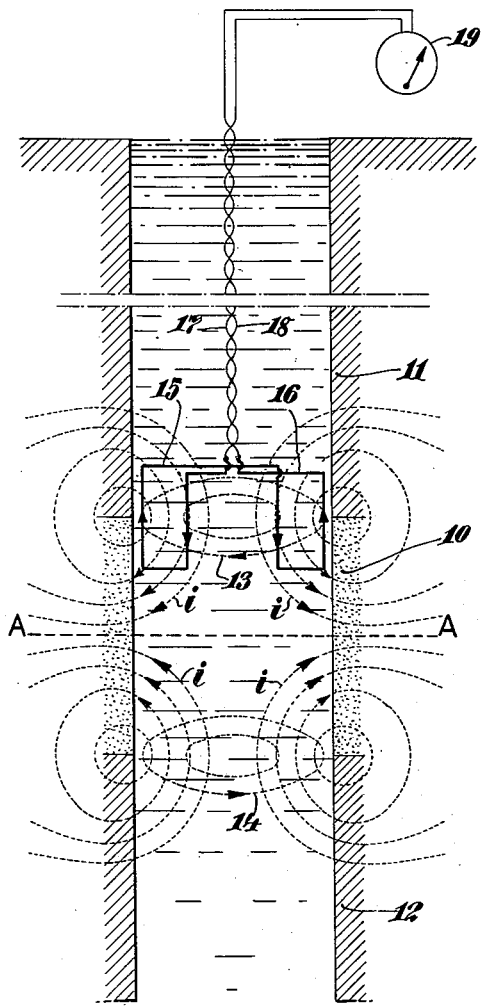
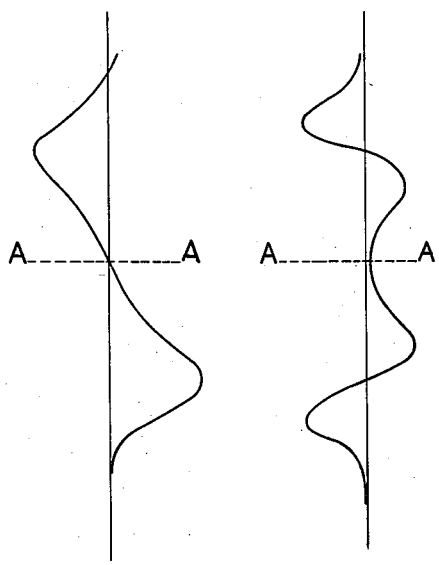
INVENTOR.
Eugene G. Leonardon,
BY
ATTORNEYS Sept. 29, 1942. E. G. LEONARDON 2,297,568
SPONTANEOUS POTENTIAL BY INDUCTION
Filed Feb. 25, 1939 2 Sheets-Sheet 2
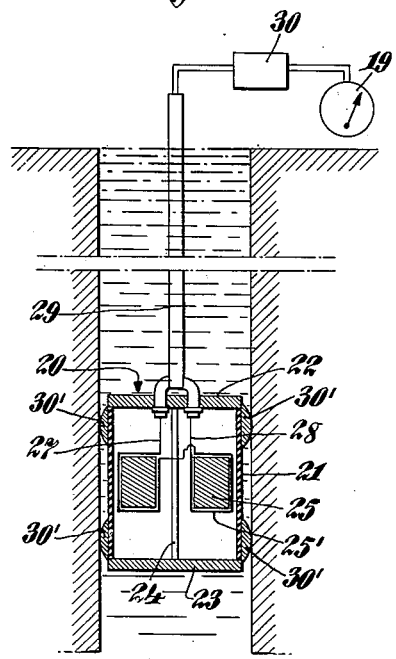
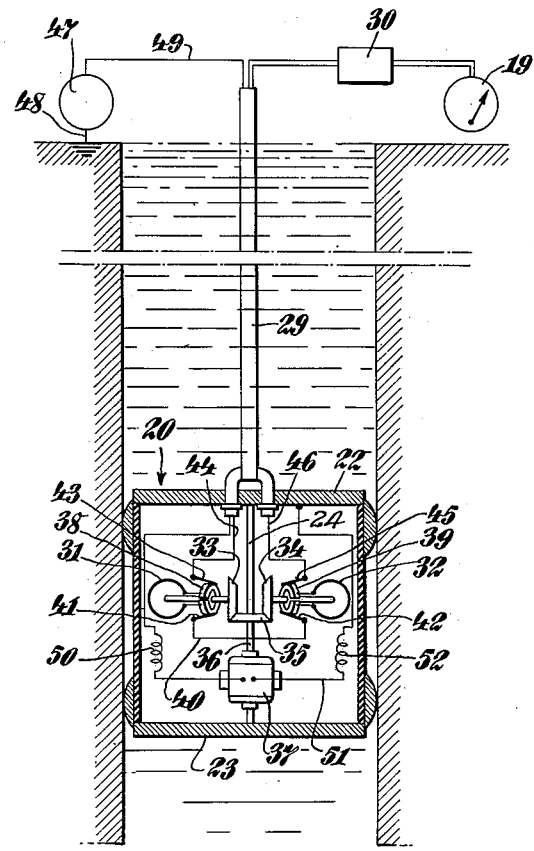
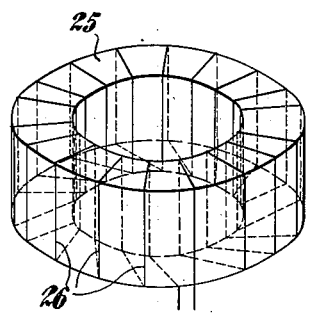
INVENTOR.
Eugene G. Leonardon,
BY
Hoguet, Neary & Campbell,
ATTORNEYS Patented Sept. 29, 1942

2,297,568

UNITED STATES PATENT OFFICE 2,297,568

SPONTANEOUS POTENTIAL BY INDUCTION

Eugene G. Leonardon, Houston, Tex., assignor to Schlumberger Well Surveying Corporation, Houston, Tex., a corporation of Delaware Application February 25, 1939, Serial No. 258,561

19 Claims. (Cl. 175—182)

The present invention relates to methods for determining the location of porous formations traversed by a bore hole. More particularly, it relates to a novel method and apparatus for locating such formations by observing in the bore hole magnetic phenomena related to the spontaneous potentials existing therein.

It is well known that the spontaneous potentials existing in a bore hole are indicative of porous formations. In the customary commercial practice such potentials are measured by moving an exploratory electrode through the bore hole and measuring the potential difference existing between the electrode and a reference point. By recording the potentials so measured, a curve may be obtained from which the location of porous strata traversed by the bore hole may be readily determined.

It has been found that the spontaneous potentials in the bore hole cause electric currents to flow in the formations, and further, that a magnetic field is associated with these currents which may be utilized to determine the location of porous strata traversed by the bore hole.

The principal object of the present invention is to provide a novel method and apparatus for locating porous formations traversed by a bore hole by observing in the bore hole magnetic phenomena related to the spontaneous potentials existing therein.

Another object of the invention is to provide a method and apparatus of the above character in which the magnetic phenomena related to the spontaneous potentials existing therein may be observed independently of the earth's magnetic field or any other stray magnetic fields which may be present in the vicinity of the bore hole.

Additional objects will become apparent from the following detailed description taken in conjunction with the accompanying drawings, in which:

Fig. 1 is a schematic drawing illustrating broadly the principles upon which the invention is based;

Fig. 1a is a plot showing the distribution of the magnetic field in the bore hole caused by an assumed flow of spontaneous currents in the formations;

Fig. 1b is a plot showing generally the curve of the voltage induced in a coil moved at a uniform rate along the bore hole by the magnetic field existing therein;

Fig. 2 is a schematic diagram of apparatus for measuring the magnetic field caused by the presence of spontaneous currents in the bore hole;

Fig. 2a illustrates in greater detail an iron core induction coil for use with the apparatus shown in Fig. 2; and Fig. 3 is a schematic diagram of inductor compass apparatus for measuring absolute values of the magnetic field caused by the flow of spontaneous currents in the formations.

The spontaneous potentials existing in bore holes comprise essentially potentials due to electro-filtration and electro-chemical potentials caused by electro-osmosis. As disclosed in prior United States Patent No. 1,913,293, electro-filtration potentials arise whenever a liquid flows through a porous dielectric, such as, for example, when water flows through sand, and they cause currents to flow in the formations in the same direction as the flow of the liquid therethrough. In a bore hole, the bore hole liquid generally flows substantially radially into the formations, so that the current flow caused by electro-filtration potentials is also directed radially into the formations. The potentials due to electro-osmosis in most cases are of the same sign as those due to electro-filtration phenomena, so that they also cause current to flow into the formations.

The distribution of current in the neighborhood of a porous formation traversed by a bore hole is indicated generally in Fig. 1, in which a porous formation 10 is shown bounded above and below by impervious formations 11 and 12, respectively. The current flow due to the presence of spontaneous potentials is indicated by the dotted lines i, and is in the direction of the arrows. While the exact current distribution in any bore hole has never been accurately determined, it is believed that the current flowing into a porous formation divides, part passing through the impervious formation adjacent the upper boundary of the porous bed, and the other part passing through the impervious formation adjacent the lower boundary of the porous bed. Thus, as shown in Fig. 1, part of the current flowing through the porous formation 10 flows through the impervious formation 11 adjacent the upper boundary, and the other part of the current passes through the impervious formation 12 adjacent the lower boundary, the circuit being completed through the liquid L in the bore hole.

With such a distribution of current flow it will be seen that adjacent the upper boundary between the porous formation 10 and the impervious formation 11, the current flow in the liquid in the bore hole is directed downwardly, whereas adjacent the lower boundary between the porous formation 10 and the impervious formation 12, the current flow in the bore hole is directed upwardly. Assuming for the sake of simplicity that the current flow in the bore hole is symmetrical about its axis, it will be evident from the well known laws of magnetism that the flow of current in the bore hole and the adjacent strata will set up a magnetic field concentric with the axis of the bore hole and lying in a plane substantially perpendicular to its axis.

The magnetic field adjacent the upper boundary between the porous formation 10 and the impervious formation 11 is indicated generally by the concentric dotted lines 13, and it has the direction indicated by the arrows. Adjacent the lower boundary between the porous formation 10 and the impervious formation 12 a similar magnetic field will be created because of the flow of current in the liquid L in the bore hole, which is indicated generally by the concentric dotted lines 14, and which has the direction indicated by the arrows. Inasmuch as the current flow adjacent the lower boundary is opposite in direction to the current flow adjacent the upper boundary, the direction of the magnetic field adjacent the lower boundary is opposite to the direction of the magnetic field adjacent the upper boundary.

The distribution of the magnetic field caused by the flow of spontaneous currents in the liquid L in the bore hole is indicated generally in Fig. 1a from which it appears that the magnitude of the magnetic field is greatest in the neighborhood of the boundaries between the porous strata 10 and the upper and lower impervious strata 11 and 12, respectively. Adjacent the center line A—A the magnetic field is substantially zero and the magnetic field tends to taper off in the impermeable strata 11 and 12 away from the boundaries between these strata and the porous strata 10.

In accordance with the invention, it is proposed to move a pick-up coil or other similar device through the bore hole in such fashion as to cut the magnetic field caused by the flow of spontaneous currents in the liquid L in the bore hole and the adjacent porous strata. As shown generally in Fig. 1, such a pick-up device may comprise a pair of co-planar coils 15 and 16 which may be symmetrically disposed about the axis of the bore hole. The coils 15 and 16 are so connected to each other that the voltages generated in each are additive, and the resultant voltage is transmitted through the wires 17 and 18 to a measuring or recording device 19 which may be located at the earth's surface. In order to minimize the influence of voltages induced in the wires 17 and 18 as they are moved through the bore hole, it is preferable that they be twisted together as shown.

Voltages are induced in the horizontal portions of the coils 15 and 16 as the latter are moved through the concentric lines of force 13 and 14 in the bore hole. Considering coil 15 alone, it will be readily apparent from an inspection of Figure 1 that the voltages induced in its upper and lower horizontal portions are in the same direction so that they tend to opposed one another in the circuit. Accordingly, the net voltage induced in the coil 15 is zero unless the magnetic field intensities at its upper and lower horizontal portions, respectively, are different.

The same is true of coil 16 so that the resultant voltage in the circuit of the coils 15 and 16 is a function of the difference between the magnetic field intensities at their upper and lower horizontal portions, respectively. In other words, the resultant voltage is a function of the time rate of change of the magnetic flux linking the coils 15 and 16 as they are moved through the bore hole.

If the coils 15 and 16 are moved through the bore hole at a uniform rate the curve of the resultant voltage will have the shape indicated generally in Fig. 1b. Inasmuch as the voltage generated in the coils 15 and 16 will be directly proportional to the time rate of change of flux linking them, the generated voltage curve of Fig. 1b is substantially the time derivative of the curve of the field distribution in the bore hole shown in Fig. 1a.

It is important to note that the coils 15 and 16 are not influenced by the presence of the earth's magnetic field or any other stray magnetic fields which may exist in the bore hole. In the case of the earth's magnetic field, for example, no voltage can be induced in the coils 15 and 16 due to its vertical component because the coils 15 and 16 themselves are disposed in a vertical plane. Furthermore, the lines of force due to the horizontal component of the earth's magnetic field will link the coils 15 and 16 in the same direction and since these coils are oppositely connected the induced voltages in the circuit will be opposed and will cancel out, so that they have no effect on the reading of the instrument 19. Likewise, other stray fields, such as magnetic fields set up by telluric currents, will not produce any resultant voltage in the circuit of the coils 15 and 16 because the magnetic lines of force linking the coils will be in the same direction and the voltages generated in the coils 15 and 16 due to such fields will be opposed and generally equal in magnitude.

Accordingly, by making measurements of the magnetic field caused by the flow of spontaneous currents in the bore hole and the adjacent porous strata in accordance with the method and apparatus generally described above, a curve may be obtained similar to that shown in Fig. 1b, from which the location of the porous strata traversed by a bore hole may be readily determined. Moreover, it will be evident from the above that the measurements will be free of errors which might be introduced by the presence of the earth's magnetic field or any other stray magnetic fields in the neighborhood of the bore hole.

Apparatus for making measurements in accordance with the invention is disclosed schematically in Fig. 2 in which the pick-up device 20 is shown, comprising a cylindrical casing 21 made of Bakelite or some other non-magnetic non-conductive material, which is provided with a top closure member 22 made of non-magnetic conductive material, such as brass, for example, and a bottom closure member 23 made of the same material, forming a watertight enclosure. The top member 22 and the bottom member 23 may be connected by means of a longitudinal rod 24, also made of a non-magnetic conductive material, and the casing 21 may be filled with oil or some other suitable insulating liquid in order to withstand the high hydraulic pressures generally encountered in wells of great depth. It will be noted that inasmuch as the top and bottom members 22 and 23 and the connecting rod 24 are made of conductive material they provide a conductive path for the current flowing in the bore hole due to the presence of spontaneous potential therein.

Within the casing 21 is an annular core 25 made of magnetic material such as soft iron, around which a pick-up coil 25' is wound. As shown in greater detail in Fig. 2a, the pick-up coil 25' comprises a plurality of coils 26 wound in series so that the voltages induced in the coils 26 will be additive and provided a resultant voltage of relatively large magnitude. The voltage induced in the winding is transmitted by means of the wires 27 and 28 through a cable 29 to a voltage amplifier 30, which in turn provides outputs of relatively large magnitude for actuating the measuring or recording device 19. A plurality of centering members 30' are provided for centering the pick-up device 20 in the bore hole.

The dimensions of the pick-up coil in any particular case will depend on the diameter of the bore hole being investigated. It may be helpful, however, to give the dimensions of a representative coil designed according to the invention. Assuming a bore hole diameter of about 8 inches, the coil might comprise a cylindrical soft iron core 25 approximately 6 inches long, having an inside diameter of about 2½ inches, an outside diameter of about 5½ inches and a winding 25' of approximately 12,000 turns thereon.

Such a coil when moved through the bore hole at a speed of about 15,000 feet per hour will provide adequate voltages to actuate the indicating instrument 19, even without an amplifier 30. When the amplifier 30 is used, it is possible to obtain satisfactory results without using the soft iron core 25.

In operation the pick-up device 20 is moved through the bore hole at a uniform rate of speed, so that the coils 26 wound on the iron core 25 will cut the magnetic lines of force set up by the spontaneous currents flowing in the bore hole adjacent the boundaries between porous strata and impermeable strata, and the induced voltages are read or recorded by the measuring or recording instrument 19. Inasmuch as the coils 26 are wound symmetrically on the core 25, it will be evident that no voltage will be generated in the circuit due to the magnetic lines of force of the earth's magnetic field or any other stray fields encountered as the pick-up device 20 is moved through the bore hole.

In the modification shown in Fig. 3, the construction is the same as in Fig. 2 except that a pair of opposite co-planar coils 31 and 32 are provided which are adapted to be driven at a constant speed through the gears 33 and 34, respectively, meshed with a gear 35 mounted on the shaft 36 of a motor 37 secured within the casing 21. Each of the coils 31 and 32 is provided with a commutator 38 and 39, respectively, for rectifying the alternating voltages induced in the coils 31 and 32, the commutators 38 and 39 being connected together through the wire 40 and the brushes 41 and 42, respectively. Commutator 38 is also adapted to engage a brush 43 which is connected through a wire 44 passing through the cable 29 to the amplifier 30 at the earth's surface. Likewise, the commutator 39 engages a brush 45 connected to a wire 46 which passes through the cable 29, completing the circuit to the amplifier 30 so that the coils 31 and 32 are connected in series.

The motor 37 is energized from a source of voltage 47, one end of which may be grounded at 48 and the other end of which is connected through the wire 49 to the motor 37. An inductance coil 50 is provided in series with the wire 49 which is adapted to compensate for the magnetic effect of the motor 37 upon the coil 31. The circuit to the motor 37 is completed through a wire 51 which is connected to the top closure member 22, a second inductance 52 being included in series with the wire 51 to compensate for the magnetic effects of the motor 37 upon the coil 32. Inasmuch as the top closure member 22 is made of conductive material, the circuit is completed to the motor 37 through the liquid in the bore hole and the surrounding earth, thus eliminating one wire in the cable 29.

This device operates essentially in the same manner as the device shown in Fig. 2 except that the motor 37 is driven at a constant speed while the pick-up device 20 is moved through the bore hole. The coils 31 and 32 are rotated in opposite directions so that the voltages induced therein due to the magnetic field set up by the flow of spontaneous currents in the bore hole are additive. The resultant voltage in the circuit is then amplified by the amplifier 30, thus providing readings of relatively large magnitude at the measuring or recording instrument 19. It will be evident that the voltages induced in the coils 31 and 32, due to their rotation in opposite directions in the earth's magnetic field, will be opposite and substantially equal in magnitude, so that they will have little or no influence on the measuring or recording instrument 19.

From the foregoing it will be apparent that the method and apparatus of the invention enable the location of porous strata traversed by a bore hole to be readily determined by detecting the magnetic field associated with the spontaneous potentials existing therein. Moreover, by reason of the particular coil arrangements used in inducing voltages proportional to the magnetic field caused by the spontaneous potentials, it is possible to obtain readings which are not influenced by the presence of the earth's magnetic field or any other stray fields which would ordinarily introduce errors into the measurements.

While several specific devices have been described above, for detecting the magnetic field due to spontaneous potentials existing in the bore hole, many other suitable devices will suggest themselves to those skilled in the art and it is to be understood that the present invention comprehends the use of all such devices. Moreover, it will be evident that the specific embodiments described above are susceptible of numerous changes in form and detail within the scope of the invention, and the latter is not intended to be in any way limited thereby except as defined in the following claims.

I claim:

1. The method of locating porous strata traversed by a bore hole which comprises the steps of detecting in the bore hole magnetic phenomena associated with the spontaneous currents existing therein.

2. The method of locating porous strata traversed by a bore hole which comprises the steps of moving a circuit in the bore hole through the magnetic field associated with the spontaneous currents existing therein, to induce a voltage in said circuit related to said spontaneous currents, and exhibiting a function of said induced voltage.

3. In apparatus for locating porous strata traversed by a bore hole, the combination of a pair of pick-up circuits, disposed about the axis of the bore hole, means for moving said circuits in the bore hole through the magnetic field associated with the spontaneous currents existing therein, to induce voltages in said circuits, and means for exhibiting a function of said induced voltages.

4. In apparatus for locating porous strata traversed by a bore hole, the combination of an annular winding adapted to be moved in the bore hole through the magnetic field associated with the spontaneous currents existing therein, to induce a voltage in said winding, and means for exhibiting a function of said induced voltage.

5. In apparatus for locating porous strata traversed by a bore hole, the combination of an annular winding having a core made of magnetic material and adapted to be moved in the bore hole through the magnetic field associated with the spontaneous currents existing therein, to induce a voltage in said winding, and means for exhibiting a function of said induced voltage.

6. In apparatus for locating porous strata traversed by a bore hole the combination of a watertight casing made of non-conductive non-magnetic material and having top and bottom closure members of conductive non-magnetic material, a conducting member connecting said top and bottom closure members, an induction circuit associated with said conducting member and responsive only to magnetic lines of force set up by a flow of current through the conducting member, and means for exhibiting a function of the response of said circuit.

7. In apparatus for locating porous strata traversed by a bore hole the combination of a watertight casing made of non-conductive non-magnetic material and having top and bottom closure members of conductive non-magnetic material, a conducting member connecting said top and bottom closure members, a pick-up winding associated with said conducting member and responsive only to magnetic lines of force set up by a flow of current through the conducting member, a core of magnetic material for the winding and means for exhibiting a function of the response of said winding.

8. In apparatus for locating porous strata traversed by a bore hole the combination of a watertight casing made of non-conductive non-magnetic material and having top and bottom closure members of conductive non-magnetic material, said casing being filled with non-magnetic non-conductive fluid, a conducting member connecting said top and bottom closure members, a pick-up winding associated with said conducting member and responsive only to magnetic lines of force set up by a flow of current through the conducting member, and means for exhibiting a function of the response of said winding.

9. In apparatus for locating porous strata traversed by a bore hole, the combination of a pair of series connected pick-up circuits disposed about the axis of the bore hole, means for rotating said circuits to induce therein voltages related to the magnetic field associated with the spontaneous currents existing in the bore hole, and means for exhibiting a function of said induced voltages.

10. In apparatus for locating porous strata traversed by a bore hole, the combination of a pair of series connected pick-up circuits, means for rotating said circuits in opposite directions about axes perpendicular to the axis of the bore hole to induce therein voltages related to the magnetic field associated with the spontaneous currents existing in the bore hole, and means for exhibiting a function of said induced voltages.

11. In apparatus for locating porous strata traversed by a bore hole, the combination of a watertight casing filled with non-magnetic non-conductive fluid, a pair of pick-up coils in the casing symmetrically disposed about the axis thereof, means for rotating said coils in opposite directions about axes perpendicular to the axis of the bore hole, to induce therein voltages related to the magnetic field associated with the spontaneous currents existing in the bore hole, means for amplifying said induced voltages, and means for exhibiting a function of said amplified voltages.

12. In apparatus for locating porous strata traversed by a bore hole, the combination of a watertight casing adapted to be lowered in the bore hole, a pair of series connected pick-up circuits in the casing, a motor for rotating said circuits to induce voltages therein related to the magnetic field associated with the spontaneous currents existing in the bore hole, means for compensating for the magnetic effects of said motor on the pick-up circuits, means for amplifying said induced voltages, and means for exhibiting a function of said amplified voltages.

13. In apparatus for locating porous strata traversed by a bore hole, the combination of a pair of series connected pick-up circuits, means for rotating said circuits in opposite directions about axes perpendicular to the axis of the bore hole, to induce therein voltages related to the magnetic field associated with the spontaneous currents existing in the bore hole, means for rectifying said induced voltages, means for amplifying said voltages, and means for exhibiting a function of said rectified and amplified voltages.

14. In apparatus for locating the porous strata traversed by a bore hole containing conductive liquid, the combination of a watertight casing made of non-magnetic material, having a top closure member of conductive material and filled with non-magnetic non-conductive fluid, a pair of series connected pick-up coils in the casing and symmetrically disposed about the axis thereof, a motor for rotating said coils in opposite directions about an axis perpendicular to the axis of the casing to induce therein voltages related to the magnetic field associated with the spontaneous currents existing in the bore hole, a source of voltage at the surface of the earth having one terminal connected to ground, an electrical connection from another terminal of the voltage source to one of the terminals of said motor, a second electrical connection from another terminal on the motor to the conductive top closure member of the casing, means for amplifying said induced voltages, and means for exhibiting a function of said amplified voltages.

15. The method of locating porous earth formations traversed by a bore hole, which comprises the steps of obtaining indications of the magnetic field produced in the bore hole by spontaneous currents flowing in the vicinity of the boundary between adjacent formations of different porosity.

16. The method of locating porous earth formations traversed by a bore hole containing a conductive liquid, which comprises the steps of obtaining indications of variations in the magnetic field produced in the bore hole by currents flowing spontaneously in the vicinity of the boundary between adjacent formations of different porosity.

17. In apparatus for locating porous strata traversed by a bore hole, the combination of a pick-up circuit responsive only to the magnetic field produced by spontaneous currents in the bore hole, means for moving said circuit through said field in the bore hole to induce a voltage therein, and means for exhibiting a function of said induced voltage.

18. In apparatus for locating porous strata traversed by a bore hole, the combination of a water-tight casing adapted to be moved through the bore hole, a pick-up circuit in the casing, said circuit being responsive only to the magnetic field associated with spontaneous currents existing in the bore hole, means for centering the casing in the bore hole, means for amplifying the response of said circuit, and means for exhibiting a function of said amplified response.

19. In apparatus for locating porous strata traversed by a bore hole, the combination of a watertight casing adapted to be lowered in the bore hole, a pair of series connected pick-up circuits in the casing, a motor for rotating said circuits to induce voltages therein related to the magnetic field associated with the spontaneous currents existing in the bore hole, means for compensating for the magnetic effects of said motor on the pick-up circuits, and means for exhibiting a function of said voltages.

EUGENE G. LEONARDON.